United States Patent [19]
Gale et al.

[11] Patent Number: 5,909,204
[45] Date of Patent: Jun. 1, 1999

[54] COLOR DISPLAY SYSTEM WITH SPATIAL LIGHT MODULATOR(S) HAVING COLOR-TO-COLOR VARIATIONS IN DATA SEQUENCING

[75] Inventors: Richard O. Gale, Richardson; Gerhard P. Deffner; Vishal Markandey, both of Dallas, all of Tex.

[73] Assignee: Texas Instruments Incorporated, Dallas, Tex.

[21] Appl. No.: 08/794,717

[22] Filed: Jan. 3, 1997

Related U.S. Application Data

[62] Division of application No. 08/429,387, Apr. 26, 1995.

[51] Int. Cl.[6] .............................. G09G 3/36; G09G 5/02; H04N 5/64; G02F 1/00
[52] U.S. Cl. .............................. 345/85; 345/84; 345/151; 348/744; 348/755; 348/771
[58] Field of Search .............................. 345/87, 89, 108, 345/8, 32, 150, 151, 147, 197, 84, 85; 348/750, 751, 598, 599, 665, 666, 771, 760, 275, 315; 382/275

[56] References Cited

U.S. PATENT DOCUMENTS

| | | | |
|---|---|---|---|
| 5,281,960 | 1/1994 | Dwyer, III | 345/8 |
| 5,300,942 | 4/1994 | Dolgoff | 345/32 |
| 5,367,342 | 11/1994 | Bang | 348/666 |
| 5,523,803 | 6/1996 | Urbanus et al. | 345/197 |
| 5,528,262 | 6/1996 | McDowall | 345/151 |
| 5,777,589 | 7/1998 | Gale et al. | 345/84 |
| 5,778,106 | 7/1998 | Juenger et al. | 382/275 |

*Primary Examiner*—Jeffery Brier
*Assistant Examiner*—David L Lewis
*Attorney, Agent, or Firm*—Charles A. Brill; Frederick J. Telecky, Jr.; Richard L. Donaldson

[57] ABSTRACT

Methods of reducing artifacts in SLM-based display systems (10, 20), whose images are based on data displayed by bit-weight for pulse-width modulated intensity levels. A first method is suitable for systems (20) that use multiple SLMs (14) to concurrently display images of different colors, which are combined at the image plane. The data for each color are staggered in time (FIG. 4). A second method is suitable for either multiple SLM systems (20) or for systems (10) that use a single SLM (14) and a color wheel (17) to display differently colored images sequentially. The data for each color is arranged in a different data sequence (FIG. 5). In either method, the intensity transitions do not occur at the same time.

2 Claims, 3 Drawing Sheets

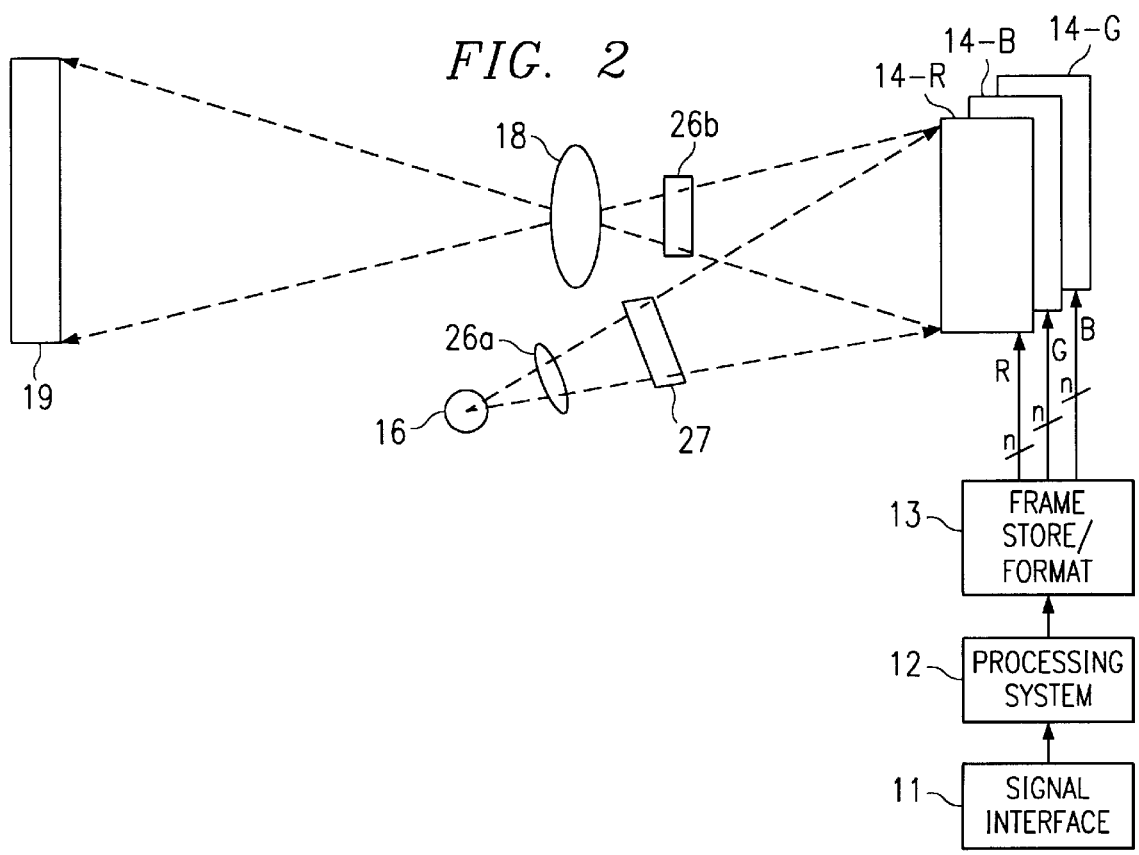
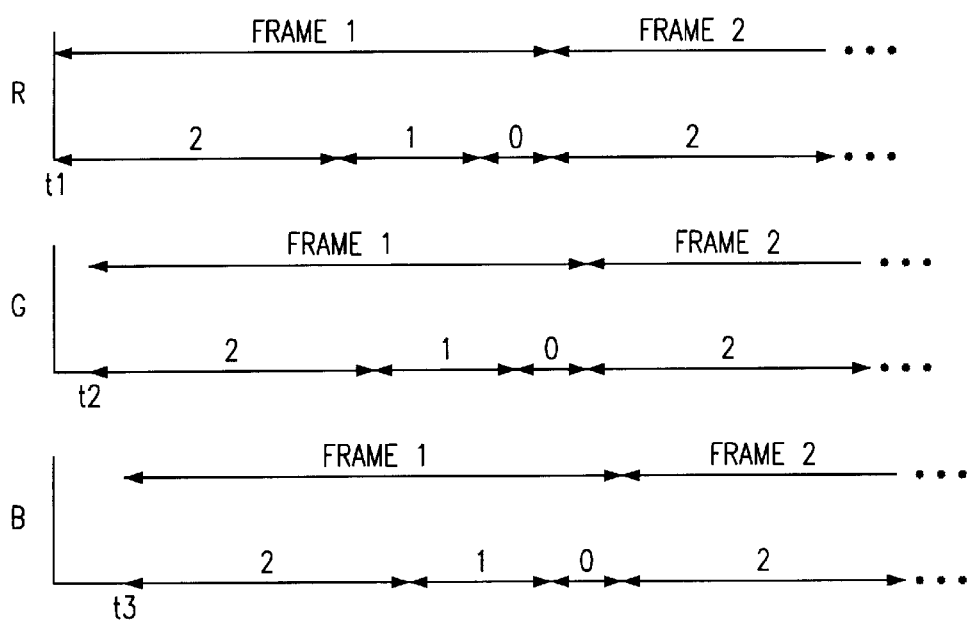

COLOR DISPLAY SYSTEM WITH SPATIAL LIGHT MODULATOR(S) HAVING COLOR-TO-COLOR VARIATIONS IN DATA SEQUENCING

This is a division of application Ser. No. 08/429,387, filed Apr. 26, 1995.

TECHNICAL FIELD OF THE INVENTION

This invention relates to image display systems, and more particularly to methods of reducing artifacts in a display system that uses one or more spatial light modulators for generating a color display.

BACKGROUND OF THE INVENTION

Image display systems based on spatial light modulators (SLMs) are increasingly being used as an alternative to image display systems based on cathode ray tubes. As used for image display applications, SLMs are arrays of pixel-generating elements that emit or reflect light to an image plane. The pixel-generating elements are often themselves referred to as "pixels", as distinguished from pixels of the image. This terminology is clear from context, so long as it is understood that more than one pixel of the SLM array can be used to generate a pixel of the image.

Digital micro-mirror devices (DMDs) are one type of SLM. A DMD has an array of hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Each mirror element provides the intensity for one pixel of the image.

The mirror elements of the DMD are individually addressable, such that the image is defined by which pixels are on or off at a given time. For addressing mirror elements of the DMD, each mirror element is in communication with a memory cell that stores a bit of data that determines the on or off state of the address signal. The addressing is binary in the sense that each mirror element is addressed with a high or low signal that indicates whether or not the m mirror element is to reflect light to the image plane. The DMD is "loaded" by storing input data in the memory cells, via a data loading circuit peripheral to the DMD's array of mirror elements.

Pixel data is delivered to the memory cells of the DMD in a special "bit-plane" format. This format arranges the data for each frame by the bit-weights of all pixels rather than pixel-by-pixel. This format permits greyscale images to be generated by addressing each mirror element with successive address signals during a frame period, each address signal representing a different bit weight of that mirror element's n-bit pixel value. For example, for 255 levels of non-black intensity, each mirror element could be addressed seven times during a frame. The more significant the bit-weight of the bit being used for addressing, the longer the mirror element would remain on. For the brightest intensity, the mirror element would be on each time it is addressed. This is essentially pulse width modulation, with many variations possible. Moving images can be generated by re-addressing the DMD with data for successive frames.

For color images, one approach is to use three DMDs, one for each primary color (R,G, B). The light from corresponding pixels of each DMD is converged so that the viewer perceives the desired color. Another approach is to use a single DMD and a color wheel having sections of primary colors. Data for different colors is sequenced and synchronized to the color wheel so that the eye integrates sequential images into a continuous color image. A third approach uses two DMDs, with one switching between two colors and the other displayed a third color.

As with all display systems, the quality of the images from a DMD-based display system is improved by eliminating artifacts. Potential artifacts include temporal contouring, which appears as flashing or banding when the observer blinks, moves his eyes, or waves his hands in front of his eyes. Another artifact is motion contouring, which appears as false contours that appear when the eye is tracking a moving object. The false contour may be a ghost image at sharp edges or an artificial contour in smoothly varying regions. Still another type of artifact is unique to DMD display systems that use a method of data loading known as memory-multiplexing.

SUMMARY OF THE INVENTION

One aspect of the invention is a "staggering" method of reducing artifacts in an image display system having multiple spatial light modulators (SLMs), each SLM displaying images based on data representing a different color. First, a display sequence for data of each color is determined. Each display sequence represents the order of display of different bit-weights during each frame period. The data for each color is delivered to the corresponding SLM. The data for each color is then displayed such that the beginning of the display sequence by each SLM is slightly offset in time from the beginning of the display sequences by the other SLMs.

Another aspect of the invention is a "scrambling" method of reducing artifacts in an image display system having multiple spatial light modulators (SLMs). A display sequence for data to be delivered to a first SLM is determined. This step is repeated for data for each SLM, such that each SLM will receive data having a different display sequence. The data for each color is then delivered to the corresponding SLM and displayed.

The "scrambling" method can also be used for single SLM systems. Although the data is displayed sequentially rather than concurrently, the display sequence can be varied from color to color. In the case of a single SLM system, the method reduces the effects of periodicity between data of different colors during a frame period.

An advantage of the invention is that it minimizes temporal contouring artifacts. Timing adjustments in accordance with the invention retain the digital nature of the display, but provide a better approximation of analog behavior. The method may be implemented without "bit-splitting" which increases the number of reset sequences that are required. In the more simple embodiments, no additional expense is required in terms of processing power or memory, and no extra system overhead is incurred.

BRIEF DESCRIPTION OF THE DRAWINGS

FIG. 2 is a block diagram of an SLM-based display system than uses multiple SLMs to provide color images.

FIG. 4 illustrates a first method of reducing artifacts.

DETAILED DESCRIPTION OF THE INVENTION

Figure 1:
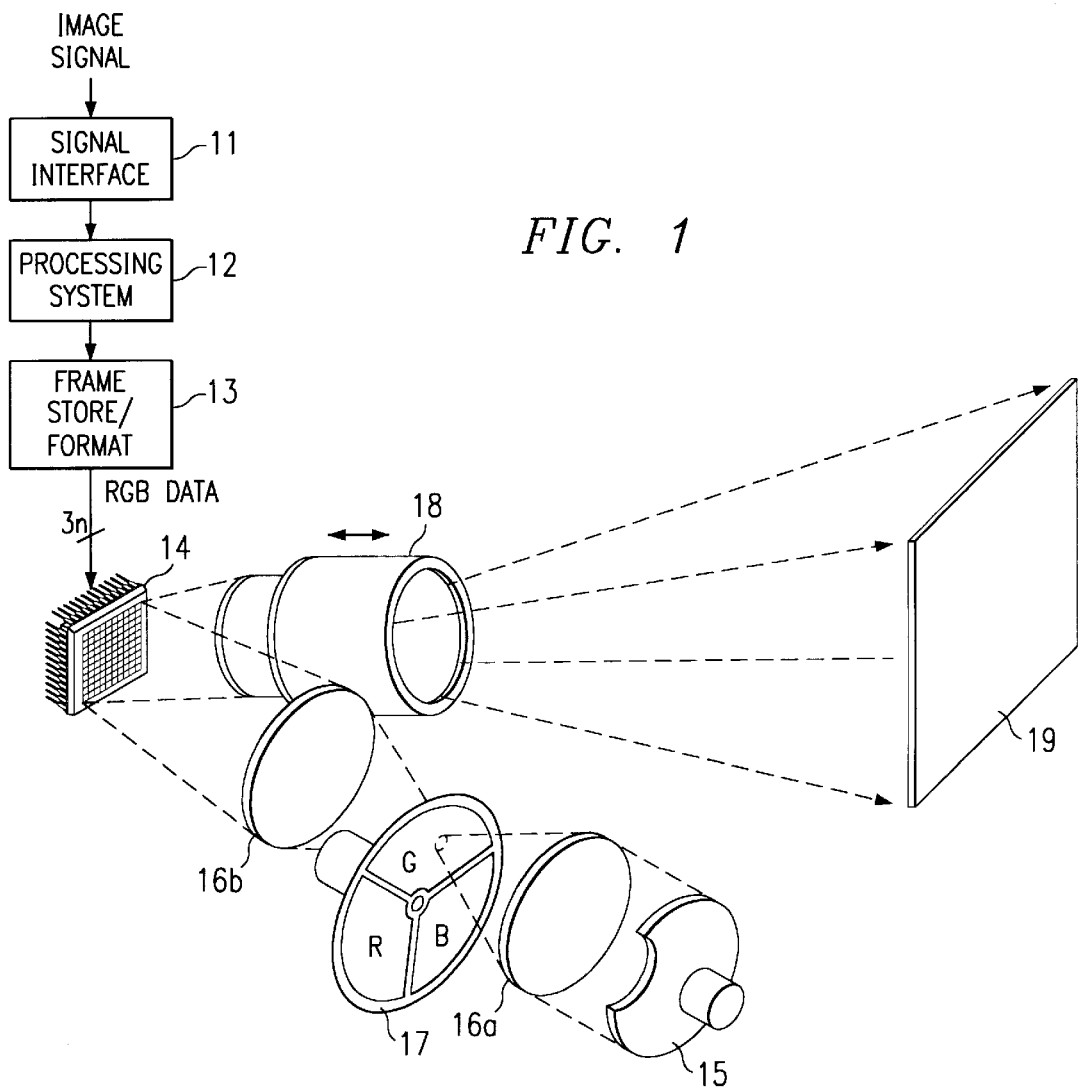
FIG. 1 is a block diagram of an SLM-based display system that uses a single SLM and a color wheel to provide color images.

FIGS. 1 and 2 are each a block diagram of an SLM-based color display system 10 and 20, respectively. System 10 uses a single SLM that sequentially displays images for different colors through a color wheel. System 20 uses three SLMs, each of which simultaneously displays data for a different color of an image. As explained below, whether the color displays are provided sequentially as in system 10 or concurrently as in system 20, each system has multiple channels of data, each channel for a different color. In general, the invention is directed to varying data sequencing on different channels so as to reduce artifacts in the displayed image.

For purposes of example, the SLM 14 of system 10 and the SLMs 14 of system 20 are DMD type SLMs. However, in general, the invention is useful for any SLM-based image display system that uses bit-plane data delivered on different data channels for different colors.

The image signal received by system 10 or system 20 may be a digital signal or an analog signal that is subsequently converted to digital form. For purposes of example, the incoming signal is assumed to be an analog signal such as a broadcast television signal.

In FIGS. 1 and 2, only those components significant to main-screen processing are shown. Other components, such as might be used for processing synchronization and audio signals or for features such as closed captioning, are not shown.

System 10 and system 20 have similar "front end" components, including a signal interface 11, processing system 12, and frame memory 13, for providing digital image data to the DMD(s) 14. These components will be discussed in common for both system 10 and system 20, with the DMD(s) 14 and associated optics for the two systems being separately described. Where both system 10 and system 20 are being discussed in common, the term "DMD(s)" refers to either the single DMD 14 of system 10 or to the multiple DMDs 14 of system 20.

Signal interface 11 receives the analog input signal and separates video, synchronization, and audio signals. Signal interface 11 includes an A/D converter and a color separator, which convert the signal into pixel data and which separate the luminance data from the chrominance data, respectively. In other embodiments, color separation could be performed before A/D conversion, using analog filters.

Processor system 12 prepares the pixel data for is display by performing various pixel processing tasks. Processor system 12 includes various memory devices for storing the pixel data during processing, such as field and line buffers.

One task typically performed by processor system 12 is progressive scan conversion of interlaced data, where each field of the interlaced data is converted to a complete frame. Other processing tasks are scaling, colorspace conversion, or gamma correction. During colorspace conversion, luminance and chrominance data are converted to RGB data. Gamma correction de-compensates gamma-compensated data because the linear characteristics of the DMD(s) 14 make gamma compensation unnecessary.

In the preferred embodiment, processor system 12 includes a "scan line video processor" for performing computational processing tasks, such as progressive scan conversion and scaling. This device is commercially available from Texas Instruments Incorporated, and permits line-by-line processing of pixel data.

Frame memory 13 receives processed pixel data from processor system 12. Frame memory 13 formats the data, on input or on output, into "bit-plane" format, and delivers bit-plane data to DMD(s). As discussed in the Background, the bit-plane format is one in which the pixel data is rearranged by bit-weight. This permits each pixel of DMD (s) 14 to be turned on or off in response to the value of one bit of data at a time.

In a typical display system 10, frame memory 13 is a "double buffer" memory, which means that it has a capacity for at least two display frames. The buffer for one display frame can be read out to DMD(s) 14 while the buffer for another display frame is being written. The two buffers are controlled in a "ping-pong" manner so that data is continuously available to DMD(s) 14.

DMD 14 is, as described in the Background, a binary device with on and off states of each mirror element. The bit-planes for each bit of data are loaded and displayed in a pulse-width modulation sequence. For n-bit pixel data, there are n bit-planes per frame period. During the frame period, the observer integrates the binary data to perceive various intensities of that frame's image.

Referring now to FIG. 1 and system 10, each frame of the RGB data to DMD 14 is provided one color at a time, such that each frame of data is divided into red, blue, and green data segments. The display time for each segment is synchronized to the color wheel 17, which rotates once per frame, so that the DMD 14 displays the data for one color through the color wheel 17 at the proper time. Thus, the data channels for each color (R,G, and B) are time-multiplexed so that each frame has sequential data for the different colors.

For the sequential color system 10, a light source 15 provides white light through a condenser lens 16a, which focuses the light to a point on the rotating color wheel 17. A second lens 16b fits the colored light to the size of the DMD's mirror array. Reflected light from the DMD projects an image onto the screen 19. A projection lens 18 accommodates various screen sizes.

Referring to FIG. 2 and system 20, data is provided to three DMDs 14 along three different data paths, one each for R, G, and B data. A light source 16 provides white light through a condenser lenses 26a, which focus the light through color filters 27. Each color filter 26 provides differently colored light (R,G, or B) to a DMD 14 that will display the data for that color. Filters 26b recombine the images from the DMDs 14 and focus the combined image to a projection lens 18, which focuses the image to a screen 19. A variation of system 20 is one in which one large DMD has an area for each color.

Comprehensive descriptions of both sequential color and multiple-DMD systems, such as system 10 and system 20, are set out in a number of patents and patent applications assigned to Texas Instruments Incorporated. These include U.S. Pat. No. 5,079,544, entitled "Standard Independent Digitized Video System"; U.S. Pat. No. 5,278,652, entitled "DMD Architecture and Timing for Use in a Pulse Width Modulated Display System"; U.S. Pat. No. 5,233,385, entitled "White Light Enhanced Color Field Sequential Projection"; U.S. patent application Ser. No. 08/147,249, entitled "Digital Television System"; and in U.S. patent application Ser. No. 08/146,385, entitled "DMD Display System". Each of these patents and patent applications are incorporated herein by reference.

A feature of the invention is the recognition that SLM displays based on bit-plane data can result in visual artifacts associated with the transitions from one bit-weight to another. For bit-plane displays, special data sequences specify the order of display times, or segments of display times, for each bit-weight of a pixel. As a simple example, one sequence for 8-bit intensity data might be 7,6,5,4,3,2, 1,0, where the display times for each bit-weight occur in descending order during the frame. If the intensity shifts from level 128 to 127 in two successive frames, the displayed bit-weights change from bit 7 on and bits 0–6 off to bits 0–6 on and bit 7 off. Under normal conditions, these levels are too close to each other in brightness to be distinguished, but when the eye moves at a critical speed or the scene moves at a critical speed, or some other mechanism creates a strobing effect, the image shows this transition in an objectionable way. Transitions between other bit-weights, such as from 64 to 63, have the same result but to a lesser extent.

Figure 3:
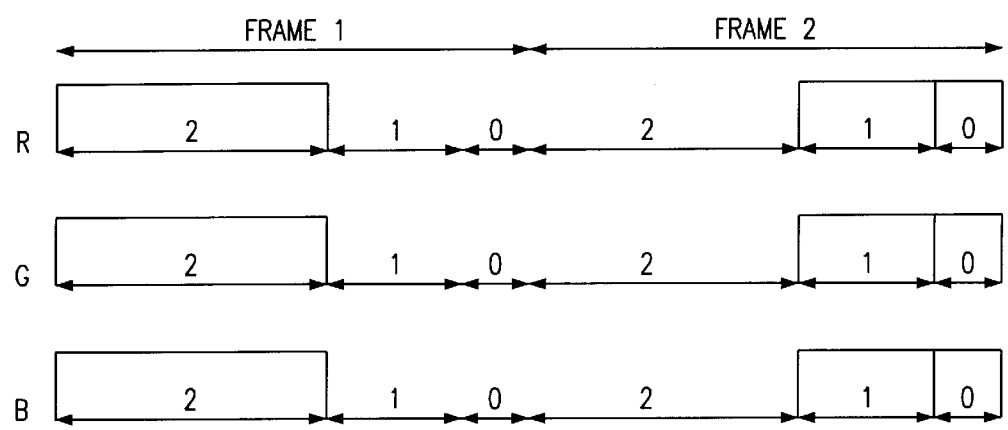
FIG. 3 illustrates a transition in a pixel's intensity value from one frame to a next, resulting in a change in whether the pixel is on during the display time for the most significant bit.

FIG. 3 illustrates the effect of bit-weight transitions in an SLM-based color display system. For purposes of this description, the colors displayed, either sequentially by system 10 or concurrently by system 20, are red, green, and blue (R, G, and B). For purposes of simplified example, it is assumed that pixel is represented by 3-bits of data per color. Bit 2 is the most significant bit (MSB), bit 1 the next significant bit, and bit 0 is the least significant bit (LSB). For each frame, bit 2 is displayed first, then bit 1, then bit 0. During the display time for each bit weight, each pixel is either on or off, depending on the value of that bit in the pixel value associated with that pixel. The maximum intensity value is 7, which occurs when all bits are on during a frame period.

In FIG. 3, the data is changing from 4 in frame 1 to 3 in frame 2. As a result, in frame 1, the pixel is on during the display time for bit 2 and off during the display time for bits 1 and 0. However, in frame 2, the pixel is off during the display time for bit 2 and on during the display time for bits 1 and 0. The result is an extended off time between frames, which can contribute to artifacts in an entire image of pixels having similar transitions.

One method of reducing artifacts caused by bit-weight transitions is to "split" bit-weights so that the display time for each higher bit-weight is segmented during the frame rather than contiguous. For example, the display time for the most significant bits might be split into two parts. For example, the data for the most significant bit (MSB) could be displayed twice during the frame period, with each of its on times being half of the total MSB time.

The invention involves the use of other display sequencing methods to reduce artifacts. Each method effectively reduces the coincidence of bit-weight transitions in a multiple SLM system or reduces the effects of periodicity of such transitions in a single SLM system. These methods may be used as an alternative or complementary solution to the bit-splitting method described in the preceding paragraph.

FIG. 4 illustrates a first method of reducing artifacts in display system 20. This method is referred to herein as the "staggering" method. As indicated, the data for each color has the same display sequence. For purposes of example, each pixel has 3 bits per color. The bit-weights are ordered 2,1,0, such that the display time for bit 2 occurs first, then the display time for bit 1, then the display time for bit 0.

The method of FIG. 4 is based on skewing the beginning of the display time for the initial bit. Thus, in the example of FIG. 4, the display sequence for red data begins at time t1, whereas the display sequences for green and blue data begin at times t2 and t3, respectively. As a result, the boundaries of the display times for the different bit weights do not coincide.

To implement the data staggering of FIG. 4, the data paths by which data for each color are delivered to the corresponding SLM must follow appropriate timing. For example, the data loading from memory 13 to SLM(s) 14 could be offset.

In a "dynamic" embodiment of the staggering method, starting times of display sequences are non-synchronized in a random or pseudo-random manner. In pseudo-random implementations, the repeat times can range from every other frame to as many frames as practicable.

Figure 5:
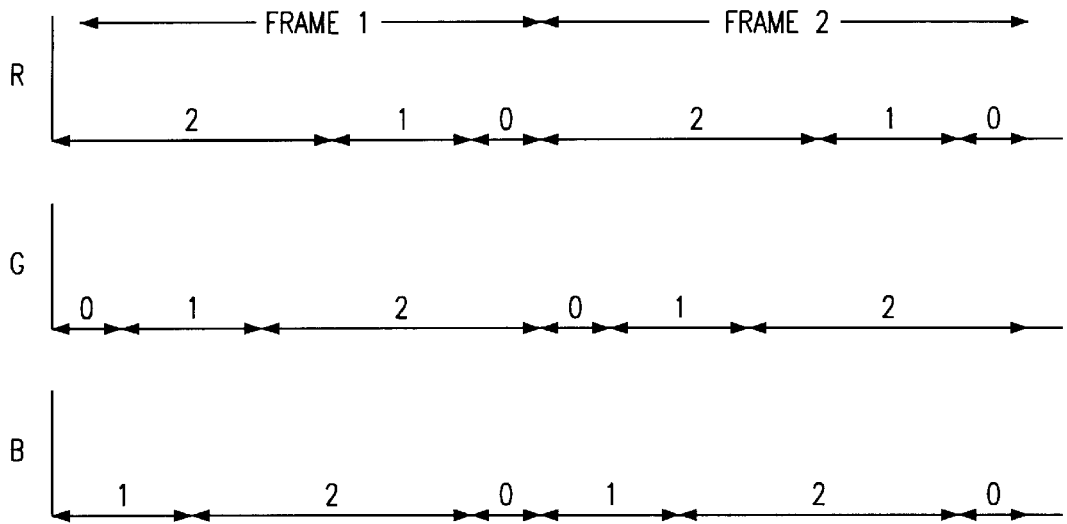
FIG. 5 illustrates a second method of reducing artifacts.

FIG. 5 illustrates a second method of reducing artifacts in either display system 10 or display system 20. This method is referred to herein as the "scrambling" method. As indicated, the data for each color has a different display sequence. For red data, the bit-weights are ordered 2,1,0. However, for green data, the bit-weights are ordered 0,1,2. For blue data, the bit-weights are ordered 1,2,0. Other orderings are possible, and expressed mathematically, for n-bit data, the bit-weights may be ordered in n! different patterns.

An advantage of the method of FIG. 5 is that in a multiple SLM system, such as system 20, each SLM can be operated from the same timing signals. Each frame begins at the same time, as determined by a frame start signal.

A variation of the scrambling method of FIG. 5 is to vary the data sequences from frame to frame, as well as from color to color. For example, the first three frames of red data might follow the following pattern:

| | |
|---|---|
| frame 1 | 2, 1, 0 |
| frame 2 | 0, 1, 2 |
| frame 3 | 1, 0, 2 |

At the same time, the first three frames of green data might follow the following pattern:

| | |
|---|---|
| frame 1 | 0, 1, 2 |
| frame 2 | 1, 0, 2 |
| frame 3 | 0, 2, 1 |

This first three frames of blue data would have a different pattern. As a result of this method of sequencing data, within each frame boundaries are offset as in the method of FIG. 5. Also, the patterns vary from frame to frame, which avoids artifacts attributable to periodicity.

For implementing the scrambling method, the possible data sequences can follow a fixed repeating pattern or can occur randomly. In the example of this description, a fixed pattern might consist of six different data sequences that would repeat every six frames. A random pattern would select from the six possible sequences.

The scrambling method is especially useful for systems having multiple DMDs, such as system 20. However, the same concept applies to systems having only two DMDs 14. Furthermore, for a single DMD system, such as system 10, the display sequences could be scrambled from color to color. This scrambling within the frame period can reduce artifacts resulting from periodicity.

An enhancement of either the staggering method of FIG. 4 or the scrambling method of FIG. 5 involves analyzing the pixel data so that the data sequencing can be adaptive to certain types of images. For example, processing system 12 might include a motion detection process to determine whether the frames of pixel data represent a still image or a moving image. Various motion detection algorithms are known in the art of pixel data processing. An example of one such algorithm, especially developed for progressive scan displays on an SLM system, is described in U.S. patent application Ser. No. 08/178,976, entitled "Video Display System with Digital De-Interlacing" assigned to Texas Instruments Incorporated and incorporated herein by reference.

As an example of a motion adaptive data sequencing, a motion signal from a motion detection process could be used to activate or deactivate the staggering method of is FIG. 4. It is anticipated that the staggering method will be better suited for still pictures. Thus, the staggering method could be activated for only still pictures. A simpler data sequence, such as one that is neither staggered nor scrambled could be used as a default data sequence.

Another adaptive strategy might be to detect picture quality characteristics such as brightness or contrast. A staggered or a scrambled data sequencing method could be activated when artifacts are most perceptible.

The staggering method of FIG. 4 and the scrambling method of FIG. 5 are both useful for "memory multiplexed" SLMs. When the SLM is a DMD, this memory multiplexing is made possible by the latching characteristic of the tilting mirrors, which remain set in an on or off position until reset. Because of this characteristic, data for one set of mirror elements may be loaded to associated memory cells while another set of mirror elements is already set. This permits multiple mirror elements to be loaded with data from the same memory cell. Each mirror element that shares a memory cell is connected to a different reset line. For the entire DMD, there are as many reset lines as mirror elements per memory cell. The mirror elements connected to a particular reset line are a "reset group". In operation, after all memory cells for a reset group of mirror elements are loaded with data, the states of these mirror elements change in response to a reset signal on that reset line. A description of memory multiplexing and its accompanying "split-reset" data loading scheme, is set out in U.S. patent application Ser. No. 08/300,356, entitled "Pixel Control Circuitry for Spatial Light Modulator", assigned to Texas Instruments Incorporated and incorporated by reference herein.

During data loading of a frame, reset groups are loaded by bit-weight during a time slice of the frame period. A "time slice" is a portion of a frame period, and is often the display period for the least significant bit. Sometimes, the time slice is shorter to allow extra time slices, but in general, it is substantially determined by the duration of the least significant bit. Data for a reset group is loaded during one time slice. Then, while a next reset group is being loaded, the mirror elements of the first reset group are set on or off in response to a reset signal.

As an example of loading and displaying a frame of data for a memory-multiplexed system, bit n of a first reset group is loaded, then bit n of a second reset group, then bit n of the third reset group, and bit n of the fourth reset groups. Next, bit n-1 of the first reset group is loaded, then bit n-1 of the second reset group, etc., until all bit-weights of all reset groups are loaded. As the data for each next bit-weight is loaded, the prior bit-weight data is displayed. Although in this example, the bit-weights follow the same order for each reset group, this is not required. In fact, among reset groups, different bit-weight sequences may be advantageous. In this manner, during each frame period, all DMD rows, via their reset groups, and all bit-weights of the data for that frame are loaded and displayed. Just as in a non memory-multiplexed system, in a single SLM system, such as system 10, the data for each color are loaded and displayed sequentially. In a multiple SLM system, the data for each color are loaded and displayed concurrently.

As an example of a memory-multiplexed system having four reset groups, a pattern for data of one color might be:
reset group 1, bit-weight sequence a
reset group 2, bit-weight sequence b
reset group 3, bit-weight sequence c
reset group 4, bit-weight sequence d As explained in the preceding paragraph, during loading and display, the bit-weights of each sequence are alternated among reset groups.

Given the above pattern for one color, the staggering method of FIG. 4 could be used in a multiple SLM system so that the pattern does not begin at the same time on each SLM 14. Also, the scrambling method of FIG. 5 could be used in either a single SLM system or a multiple SLM system so that the data sequencing varies from color to color.

Figure 6A:
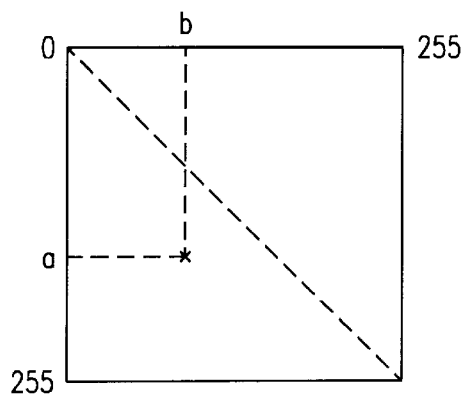
FIGS. 6A and 6B illustrate the transition energies of intensity transitions.
Figure 6B:
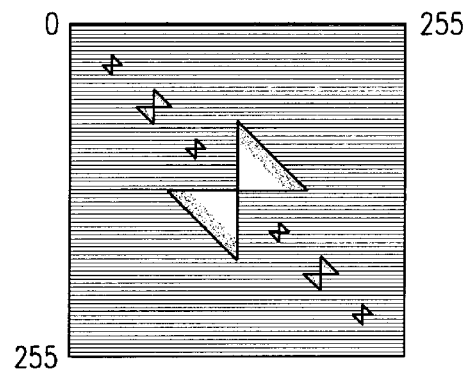

FIGS. 6A and 6B illustrate a transition energy analysis of the bit-weight transitions described above in connection with FIG. 3. As explained below, this type of energy analysis can be used to optimize the scrambling method of FIG. 5.

FIG. 6A shows the energy for every possible transition for 8-bit intensity values. The horizontal and vertical axes range from 0 to 255. The pixel value at x(a,b) represents the energy in transitioning from a to b or vice versa. Peaks in transition energy occur at significant bit transitions such as 127 to 128 or 63 to 64, or vice versa. The transition energy is symmetric about the diagonal illustrated in dashed line. The transition energy may be positive (when moving to a higher intensity level) or negative (when moving to a lower intensity level). FIG. 6B is an energy map that represents the transition energies when data is displayed in a manner such that each bit-weight is on or off for a contiguous and proportional part of the total frame time. It illustrates the concentration of energies at transition periods when data is displayed in this manner.

Figure 7:
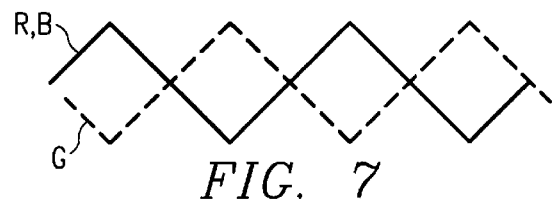
FIGS. 7 and 8 illustrate a third method of reducing artifacts.
Figure 8:
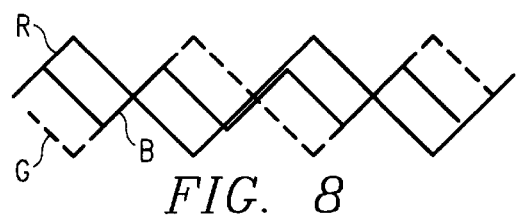

FIGS. 7 and 8 illustrate another method of reducing artifacts in display system 20. Essentially, this is a "split timing" method, in which the display sequences for R, G, and B data are different. These methods involve the recognition that negative and positive transition energies can "cancel" and thereby reduce artifacts. The destructive addition of transition energies reduces the overall perceived transition energy.

FIG. 7 illustrates the transition energies of a first data loading pattern, used for R and B data, and a second data loading pattern, used for G data. In practice, the data loading pattern for R and B data has been analyzed for transition energies, and a data loading pattern for G is devised that has "asymmetric" transition energies. When the transition energy of the pattern for R and B data is high, the transition energy of the pattern for G data is low. Ideally, when one pattern has energy of a positive value, x, the other pattern has energy of a corresponding magnitude, -x.

In FIG. 8, the data loading pattern is different for the data of all three colors. The B data has more split segments than the R or the G data.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that is fall within the true scope of the invention.

What is claimed is:

1. A method of reducing artifacts in an image display system having multiple spatial light modulators (SLMs), each SLM concurrently displaying images based on data representing a different color, comprising the steps of:

determining a first display sequence for data of a first color, wherein said first display sequence represents the order of display of different bit-weights during each frame period;

analyzing said first display sequence to determine energy levels during said first display sequence;

determining a second display sequence for data of a second color, said second display sequence having substantially asymmetric energy transition levels as compared to said first display sequence;

delivering said data of each color to a corresponding SLM; and displaying said data of each color, such that said data for each color combines simultaneously with said data for each other color, resulting in a colored image.

2. A method of reducing artifacts in an image display system having a single spatial light modulator (SLM), that sequentially displays images based on data representing different colors via a color wheel, comprising the steps of:

determining a first display sequence for data of a first color, wherein said first display sequence represents the order of display of different bit-weights during each frame period;

analyzing said first display sequence to determine energy levels during said first display sequence;

determining a second display sequence for data of a second color, said second display sequence having substantially asymmetric energy transition levels as compared to said first display sequence;

delivering said data of each color to said SLM; and displaying said data of each color.

* * * * *